United States Patent [19]

Sato

[11] 4,057,379
[45] Nov. 8, 1977

[54] KNEADING AND EXTRUDING APPARATUS FOR EXTRUDABLE MATERIAL

[75] Inventor: Takuya Sato, Yao, Japan

[73] Assignee: Sato Iron Works Co., Ltd., Yao, Japan

[21] Appl. No.: 518,734

[22] Filed: Oct. 29, 1974

[30] Foreign Application Priority Data

June 4, 1974 Japan .............................. 49-65193[U]

[51] Int. Cl.² ................................................. B29F 3/00
[52] U.S. Cl. ........................................ 425/199; 366/87; 425/207; 425/209; 425/376 R
[58] Field of Search ............... 425/197, 198, 199, 308, 425/309, 311, 190, 191, 192, 188, 376, 461, 207, 209; 259/193; 241/82.1, 82.2, 82.7, 82.5

[56] References Cited

U.S. PATENT DOCUMENTS

| | | | |
|---|---|---|---|
| 2,257,067 | 9/1941 | Parsons | 425/197 X |
| 2,593,136 | 4/1952 | Gliss | 425/199 X |
| 3,111,739 | 11/1963 | Horton et al. | 425/197 |
| 3,480,997 | 12/1969 | List | 425/199 X |
| 3,756,574 | 9/1973 | Maddock | 259/193 |
| 3,801,248 | 4/1974 | Fischer | 425/199 |

Primary Examiner—Francis S. Husar
Assistant Examiner—Mark Rosenbaum
Attorney, Agent, or Firm—Young & Thompson

[57] ABSTRACT

A kneading and extruding apparatus for extrudable material such as soap material and its additives, comprising a perforated rotating disc at an output end of a kneading screw shaft, a perforated stationary disc adjacent to the rotating disc to form a clearance therebetween, a punching plate fixed to the stationary disc confronting the rotating disc and formed with a great number of small holes having a diameter smaller than those of the holes of the rotating and stationary discs, and a blade-like cutter for serving the material extruded through the holes of the stationary disc. The material is sheared in the clearance between the rotating disc and the punching plate to blend the material and the additives effectively.

3 Claims, 4 Drawing Figures

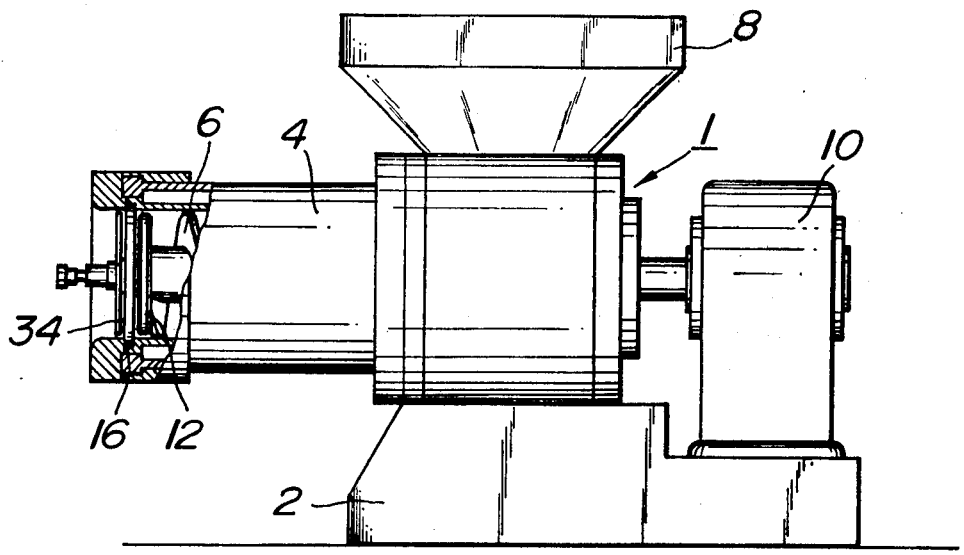
FIG_1
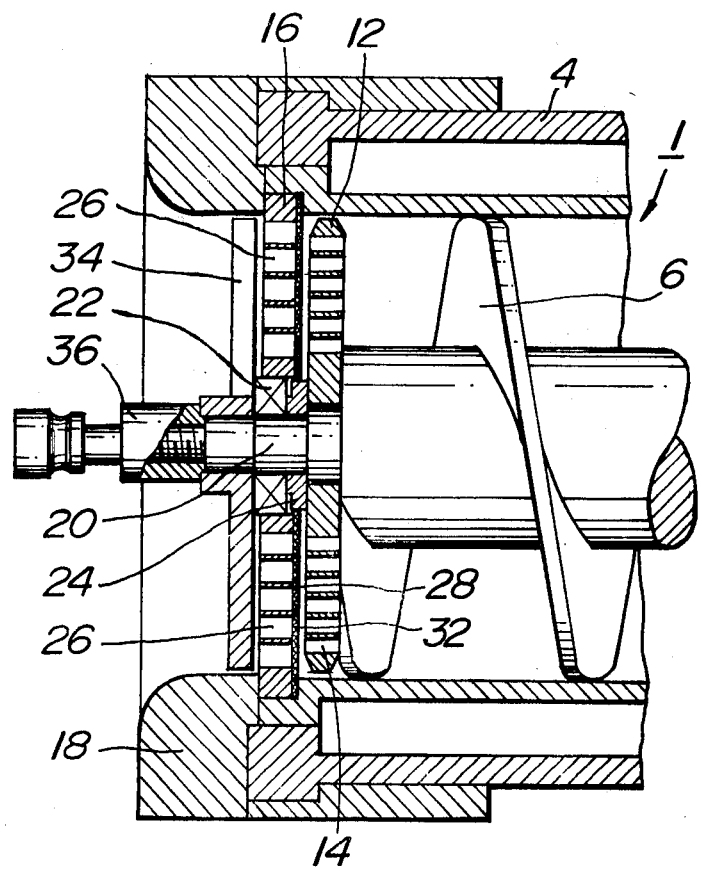
FIG_2

U.S. Patent   Nov. 8, 1977   Sheet 2 of 2   4,057,379
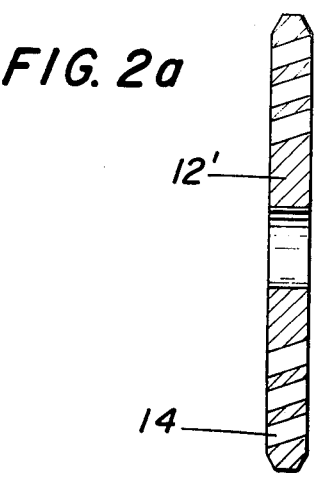
FIG. 2a
FIG. 3
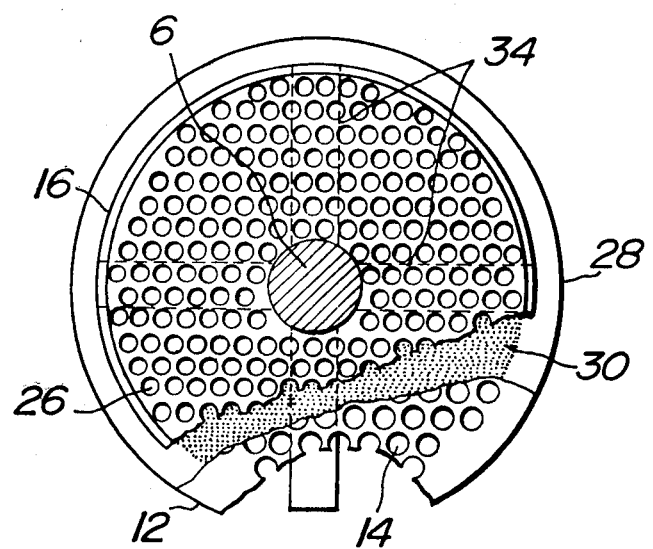

KNEADING AND EXTRUDING APPARATUS FOR EXTRUDABLE MATERIAL

BACKGROUND OF THE INVENTION

1. Field of the Invention

The present invention relates to a kneading and extruding apparatus for kneading and extruding relatively soft material such as soap material and its additives, and more partcularly a soap kneading and extruding apparatus for adding perfume and pigment to soap material in the form of flakes or pellets and kneading and extruding them in soap manufacturing processes.

2. Description of the Prior Art

In soap manufacturing processes of the prior art, to soap material is added perfume and pigment and kneaded by means of a plurality of roller mill type mixers for a fairly long period of time in order to homogenize the material and the additions which are often unevenly dried or partially over-dried during drying processes.

The use of such roll mill type mixers may often limit the output of soap paricularly in a continuous massproduction and permits a relatively large amount of material to lose during mixing the material therein and the operation of the roll mill type mixer requires experienced personnel.

Kneaders each having a screw shaft have been used for blending and kneading soap material with perfume and pigment. However, such kneaders are not effective to blend the unevenly dried or partially over-dried soap material and its additives, so that after extruding the materials from the kneaders they must be again blended in further roll mill type mixers which complicate the manufacturing processes and increase the cost of the soap.

Soaps in the form of flakes or needles have been used for industrial purposes in order to make it easy for the soap to dissolve in water. Such soaps are shaped into flakes or needles by forcing soap material through a fine wire screen during which process there is a tendency of the material to close the openings of the screen and stop thereat owing to the unevenly dried condition of the material, which requires further careful mixing of the material in roll mill type mixers.

SUMMARY OF THE INVENTION

A primary object of the invention is, therefore, to provide an improved kneading and extruding apparatus which overcomes the above disadvantages of the prior art apparatus for blending and extruding relatively soft material or extrudable material, such as soap with its additives, and are capable of uniformly mixing the material rapidly and effectively to obtain high quality products.

Another object of the invention is to provide an improved kneading and extruding apparatus comprising a perforated rotating disc and a perforated stationary disc provided with a punching plate, between which rotating disc and punching plate the material and its additives are effectively sheared, so that more uniform mixing of the material and additives is accomplished and a more uniformly dried condition is obtained even though unevenly dried or partially over-dried materials are supplied into the apparatus.

In order to achieve the above objects, the apparatus according to the invention comprises a base, a housing supported on the base and having an inlet opening at its one end and an outlet opening at the other end for receiving and discharging material, a hopper communicating with said inlet opening, a screw feeder housed in said housing for kneading and forcing said material toward said outlet opening of the housing, a driving means for driving said screw feeder, a perforated rotating disc adjacent to said other end of the housing and formed with a number of through holes causing the material to pass through while rotating, a perforated stationary disc fixed to said other end of the housing downstream of said rotating disc to form a clearance therewith and formed with a number of through holes causing the material to pass therethrough, and a perforated punching plate fixed to a surface of said stationary disc confronting said rotating disc and formed with a number of small holes, whereby the material passed through said holes of said rotating disc is sheared between the rotating disc and said punching plate.

With the arrangement according to the invention, the apparatus can perform effective kneading to obtain high quality mixed material or high quality soap even though supplied with unevenly dried soap material additives and minimize losses of material and makes possible a full automation of processes such as soap manufacturing processes, improved continuous production and a simplification of installations.

BRIEF DESCRIPTION OF THE DRAWINGS

These and other objects, features and advantages of the invention will become more apparent upon a reading of the following detailed specification and drawings, in which:

FIG. 1 is a side view, partially broken away, of the apparatus according to the invention;

FIG. 2 is an enlarged sectional view of the main part of the apparatus shown in FIG. 1;

FIG. 2a shows a modified form of the rotating disc of FIG. 2; and

FIG. 3 is a front elevation of the part shown in FIG. 2.

DESCRIPTION OF THE PREFERRED EMBODIMENTS

Referring more particularly to FIG. 1, reference numeral 1 indicates the kneading and extruding apparatus supported on a base 2 comprising a cylinder or housing 4 horizontally extending and having an inlet opening (not shown) at its rear end or right hand end and an outlet opening at its front end or left hand end as viewed in the drawing for receiving and exhausting extrudable material such as soap material and additives such as perfume and pigment, a rotating screw shaft or screw feeder 6 arranged within the cylinder 4 for kneading and extruding the material, a hopper 8 provided on the top of the cylinder in communication therewith through the inlet opening for supplying into the cylinder the soap material and a driving mechanism 10 consisting of a motor and a reduction gear (not shown) for rotatingly driving the screw shaft. The invention will now be explained with the above kneading apparatus, however, it will be understood that the invention can be applied to any other type kneaders or extruders and those for any other materials.

A preferred embodiment of the invention is shown in FIG. 2 wherein there is provided a perforated rotating disc 12 fixed to the front end of the screw shaft 6 as by means of key and key way connection (not shown) for rotation with the screw shaft 6. The rotating disc 12 is provided over substantially all its surface with a great number of through holes 14 whose axes are substantially perpendicular to its surface and having a diameter from 10 to 20 millimeters and an open area of about 60–60 percent. The axes of the holes 14 may be at an angle to the surface of the disc 12, as shown in FIG. 2a. The soap material is forced through these holes so as to be divided into a number of filaments or rods.

Adjacent to the disc 12 a stationary perforated disc 16 is provided at the outlet end of the cylinder 4 to form a clearance with the disc 12. In the illustrated embodiment the disc 16 is snugly fitted in a shoulder at the outlet end of the cylinder and restrained by an annular plate 18. An extension 20 of the screw shaft 6 is journalled in a bearing 22 adjacent to a washer 24 holding the disc 12 on the screw shaft 6, the bearing 22 being supported in a central aperture of the stationary disc 16. The stationary disc 16 is also formed with a great number of through holes 26 having a diameter from 8–20 millimeters. The stationary disc 16 is provided on its surface confronting the rotating disc 12 with a punching plate 28 which is provided all thereover with a great number of small through holes 30 having a diameter 0.8–1.5 millimeters and is secured to the surface of the stationary disc 16 by means of any desired fastening means, such as screws. A screen having fine openings my be provided between the stationary disc 16 and the punching plate 28 to improve a function of the punching plate later described.

The extension 20 of the screw shaft 6 is further provided with a blade-like cutter 34 having sharp edges as shown in the drawings rotating with the screw shaft and having clearance with the stationary disc 16. The cutter 34 is restrained by a screw threaded sleeve 36 engaging a threaded portion of the extension 20.

It is preferable to provide means for adjusting the clearance between the rotating disc 12 and the stationary disc 16 within a range for example of 1–5 millimeters depending upon particular characteristics and components of soaps. For this purpose the washer 24 may be replaced with a thinner or thicker washer or any adjusting means may be provided which enables the clearance to be varied on the outside of the apparatus which is known by those skilled in the art and so is not explained in detail.

The important members of the apparatus, for example, the rotating and stationary discs 12 and 16 and the punching plate 28 are of course made of a metal inert to soap material such as stainless steel.

In operation, the rotating disc 12 and the cutter 34 are rotated with the screw shaft 6 by means of the driving mechanism 10, while a mixture is supplied into the hopper 8, which is soap material in the form of flakes or pellets blended in a predetermined compounding ratio and perfume and pigment. The supplied material and the additions are kneaded in the cylinder 4 by the screw shaft 6 and forced toward the front end of the cylinder 4.

The kneaded soap material which is being advanced toward the front end of the cylinder 4 passes through the holes 14 of the rotating disc 12 to produce a number of filaments or rods which are then extruded through the small holes 30 of the punching plate 28 into the form of very thin filaments or rods while during this movement the material is sheared between the rotating disc 12 and the punching plate 28 to increase the kneading effect of the apparatus. This shearing between the stationary disc 16 with the punching plate and the rotating disc 12 is very important for the invention from which more uniform mixing of the soap material with the perfume and the pigment can be accomplished and more uniform dried condition can be obtained even though unevenly dried or partially over-dried materials are supplied into the apparatus.

The effective mixing during shearing the material between the rotating disc and the punching plate serves to prevent the material from clogging the small holes of the punching plate.

The material extruded through the small holes 30 of the punching plate 28 and hence the holes 26 of the stationary disc 16 is then severed by the cutter 34 into short pieces in the form of needles. The pieces of the soap cut by the cutter are transferred to the next process, for example, a forming process using molds for manufacturing toilet soaps. If desired, the pieces of the soap are received in bags of polyethylene for providing them for industrial purposes without being treated in a subsequent process.

It is not necessary to arrange a series of conventional apparatuses wherein material kneaded by a screw shaft of each of the apparatuses is severed simultaneously when the material has passed through holes of a disc rotating with the screw shaft.

As can be seen from the above description, the apparatus according to the invention can perform effective kneading to obtain high quality soap even though supplied with unevenly dried soap additives and minimizes losses of material and makes possible a full automation of soap manufacturing processes, improved continuous production and a simplication of installations.

It will be understood by those skilled in the art that the foregoing description is a preferred embodiment of the disclosed apparatus and that various changes and modifications may be made in the invention without departing from the spirit and scope thereof.

I claim:

1. In a kneading and extending apparatus, comprising a base, a housing supported on the base and having an inlet opening at its one end and an outlet opening at the other end for receiving and discharging material, a hopper communicating with said inlet opening, a screw feeder housed in said housing for kneading and forcing said material toward said outlet opening of the housing, driving means connected to said screw feeder for driving said screw feeder, a perforated rotating disc secured to said screw feeder and rotating adjacent to said other end of the housing and formed with a number of holes through which the material passes while rotating, a perforated stationary disc fixed to said other end of the housing downstream of said rotating disc and having clearance with said rotating disc and formed with a number of holes through which the material passes, and a perforated punching plate fixed to a surface of said stationary disc that confronts said rotating disc and formed with a number of holes smaller than the holes through said discs, said perforated punching plate having clearance with said rotating disc within a range of 1–5 millimeters, whereby the material that passes through said holes of said rotating disc is turned into parallel with a surface of said perforated punching plate to aid the material to be sheared between the rotating disc and said punching plate; the improvement wherein said holes of the rotating disc are formed perpendicularly to surfaces of the disc and have a diameter of 10–20 millimeters and the total open area of the holes is about 60–70% of the area of the rotating disc.

2. In a kneading and extruding apparatus, comprising a base, a housing supported on the base and having an inlet opening at its one end and an outlet opening at the other end for receiving and discharging material, a hopper communicating with said inlet opening, a screw feeder housed in said housing for kneading and forcing said material toward said outlet opening of the housing, driving means connected to said screw feeder for driving said screw feeder, a perforated rotating disc secured to said screw feeder and rotating adjacent to said other end of the housing and formed with a number of holes through which the material passes while rotating, a perforated stationary disc fixed to said other end of the housing downstream of said rotating disc and having clearance with said rotating disc and formed with a number of holes through which the material passes, and a perforated punching plate fixed to a surface of said stationary disc that confronts said rotating disc and formed with a number of holes smaller than the holes through said discs, said perforated punching plate having clearance with said rotating disc within a range of 1-5 millimeters, whereby the material that passes through said holes of said rotating disc is turned into parallel with a surface of said perforated punching plate to aid the material to be sheared between the rotating disc and said punching plate; the improvement wherein said holes of the rotating disc are formed at an angle to its surface and have a diameter of 10-20 millimeters and the total open area of the holes is about 60-70% of the area of the rotating disc.

3. In a kneading and extruding apparatus, comprising a base, a housing supported on the base and having an inlet opening at its one end and an outlet opening at the other end for receiving and discharging material, a hopper communicating with said inlet opening, a screw feeder housed in said housing for kneading and forcing said material toward said outlet opening of the housing, driving means connected to said screw feeder for driving said screw feeder, a perforated rotating disc secured to said screw feeder and rotating adjacent to said other end of the housing and formed with a number of holes through which the material passes while rotating, a perforated stationary disc fixed to said other end of the housing downstream of said rotating disc and having clearance with said rotating disc and formed with a number of holes through which the material passes, and a perforated punching plate fixed to a surface of said stationary disc that confronts said rotating disc and formed with a number of holes smaller than the holes through said discs, said perforated punching plate having clearance with said rotating disc within a range of 1-5 millimeters, whereby the material that passes through said holes of said rotating disc is turned into parallel with a surface of said perforated punching plate to aid the material to be sheared between the rotating disc and said punching plate; the improvement wherein said holes of the rotating disc have a diameter of 10-20 millimeters and the total open area of the holes is about 60-70% of the area of the rotating disc, said holes of said stationary disc have a diameter of 8-20 millimeters, and said holes of said punching plate have a diameter of 0.8-1.5 millimeters.

* * * * *